United States Patent
Wong et al.

(10) Patent No.: US 9,448,723 B2
(45) Date of Patent: Sep. 20, 2016

(54) METHOD AND APPARATUS FOR INTUITIVE NAVIGATION OF A MEDIA PROGRAM

(75) Inventors: Robert Masao Wong, Los Angeles, CA (US); Charles Barclay Reeves, Los Angeles, CA (US); Eugene Chuan-Huai Wei, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 1239 days.

(21) Appl. No.: 12/896,803

(22) Filed: Oct. 1, 2010

(65) Prior Publication Data

US 2011/0320945 A1    Dec. 29, 2011

Related U.S. Application Data

(60) Provisional application No. 61/359,309, filed on Jun. 28, 2010.

(51) Int. Cl.
*G06F 3/0488* (2013.01)

(52) U.S. Cl.
CPC .................. *G06F 3/04886* (2013.01)

(58) Field of Classification Search
CPC .............. G06F 3/0484; G06F 3/0482; G06F 3/04817; G06F 3/04842; G06F 3/0485
USPC ........................................................ 715/716
See application file for complete search history.

(56) References Cited

U.S. PATENT DOCUMENTS

| | | | |
|---|---|---|---|
| 6,281,940 B1 * | 8/2001 | Sciammarella | 348/564 |
| 6,892,353 B1 * | 5/2005 | Ubillos | 715/727 |
| 6,990,637 B2 * | 1/2006 | Anthony | G06F 3/04815 382/171 |
| 7,165,219 B1 * | 1/2007 | Peters et al. | 715/716 |
| 7,197,557 B1 | 3/2007 | Asar et al. | |
| 7,818,444 B2 | 10/2010 | Brueck et al. | |
| 7,823,056 B1 * | 10/2010 | Davey et al. | 715/202 |
| 2002/0133247 A1 | 9/2002 | Smith et al. | |
| 2005/0252959 A1 | 11/2005 | Gaumond et al. | |
| 2005/0278761 A1 | 12/2005 | Gonder et al. | |

(Continued)

FOREIGN PATENT DOCUMENTS

| | | |
|---|---|---|
| EP | 2023627 | 2/2009 |
| GB | 2457892 | 9/2009 |

(Continued)

OTHER PUBLICATIONS

International Search Report, PCT Application No. PCT/US2011/041898, mailed Oct. 28, 2011.

(Continued)

*Primary Examiner* — Jeffrey A Gaffin
*Assistant Examiner* — Sabrina Greene
(74) *Attorney, Agent, or Firm* — Fountainhead Law Group P.C.

(57) ABSTRACT

A jog control for navigating a media program having a plurality of frames and a method for using the navigation control is disclosed. In an exemplary embodiment, the control comprises a radial control at one of a plurality of user-selectable radial distances from a center of the jog control, the radial distance indicative of a jog control scale factor, wherein selection of the radial control selects and fixes the jog control scale factor until the control area is unselected, and wherein rotation of the selected radial control about a center of the jog control commands navigation through the plurality of media program frames at a rate determined by the selected jog control scale factor and an angular rate of the selected radial control about the center of the jog control.

30 Claims, 6 Drawing Sheets

(56) References Cited

U.S. PATENT DOCUMENTS

| | | |
|---|---|---|
| 2006/0033721 A1 | 2/2006 | Woolley et al. |
| 2007/0021152 A1 | 1/2007 | Jung |
| 2007/0083822 A1 | 4/2007 | Robbin et al. |
| 2007/0136488 A1 | 6/2007 | Cho et al. |
| 2007/0157241 A1 | 7/2007 | Walker |
| 2007/0192193 A1 | 8/2007 | Haberman et al. |
| 2008/0134043 A1 | 6/2008 | Georgis et al. |
| 2008/0155590 A1 | 6/2008 | Soukup et al. |
| 2008/0238708 A1 | 10/2008 | Pittard et al. |
| 2009/0094634 A1 | 4/2009 | Haberman et al. |
| 2009/0106082 A1 | 4/2009 | Senti et al. |
| 2009/0150941 A1 | 6/2009 | Riedl et al. |
| 2009/0164944 A1 | 6/2009 | Webster et al. |
| 2009/0185619 A1 | 7/2009 | Taleb et al. |
| 2009/0287841 A1 | 11/2009 | Chapweske et al. |
| 2010/0030644 A1 | 2/2010 | Dhamodharan |
| 2010/0057928 A1 | 3/2010 | Kapoor et al. |
| 2010/0077095 A1 | 3/2010 | Wong et al. |
| 2010/0106852 A1 | 4/2010 | Kindig et al. |
| 2010/0107126 A1 | 4/2010 | Lin et al. |
| 2010/0121891 A1 | 5/2010 | Zampiello |
| 2010/0131993 A1 | 5/2010 | Sanitate et al. |
| 2011/0072105 A1 | 3/2011 | Biderman |
| 2011/0082915 A1 | 4/2011 | Carr et al. |
| 2011/0087553 A1 | 4/2011 | Mishra et al. |
| 2011/0145726 A1 | 6/2011 | Wei et al. |
| 2011/0246661 A1 | 10/2011 | Manzari et al. |
| 2011/0320287 A1 | 12/2011 | Holt et al. |
| 2011/0320626 A1 | 12/2011 | Wong et al. |
| 2012/0047166 A1 | 2/2012 | Katz et al. |
| 2013/0166765 A1 | 6/2013 | Kaufman |
| 2014/0310757 A1 | 10/2014 | Ho et al. |

FOREIGN PATENT DOCUMENTS

| | | |
|---|---|---|
| JP | 2001-359073 A | 12/2001 |
| JP | 2003-242074 A | 8/2003 |
| JP | 2004-064330 A | 2/2004 |
| JP | 2004-356867 A | 12/2004 |
| JP | 2005-295467 A | 10/2005 |
| JP | 2006-501711 A | 1/2006 |
| JP | 2008-306600 A | 12/2008 |
| JP | 2009-522850 A | 6/2009 |
| JP | 2010-109791 A | 5/2010 |
| WO | 2005029770 | 3/2005 |
| WO | 2008/007677 A1 | 1/2008 |
| WO | 2008-121639 A1 | 10/2008 |
| WO | 2010-058549 A1 | 5/2010 |
| WO | 2010-078281 A2 | 7/2010 |

OTHER PUBLICATIONS

International Search Report, PCT Application No. PCT/US2011/041774, mailed Nov. 3, 2011.
International Search Report, PCT Application No. PCT/US2011/041778, mailed Oct. 26, 2011.
U.S. Appl. No. 12/950,563, filed Nov. 19, 2010 entitled "Method and Apparatus for Providing Streaming Media Programs and Targeted Advertisements Compatibly with HTTP Live Streaming".
U.S. Appl. No. 12/912,020, filed Oct. 26, 2010 entitled "Method and Apparatus for Synchronizing Paused Playback Across Platforms".
Extended European Search Report, mailed Aug. 7, 2015, from a corresponding foreign application), EP 11807255.2.
European Search Report mailed May 9, 2014 from European Application No. 11807256.0, 7 pages.

\* cited by examiner

```
#EXTM3U
#EXT-X-VERSION:2
#EXT-X-TARGETDURATION:14
#EXT-X-MEDIA-SEQUENCE:0
#EXT-X-ALLOW-CACHE:NO
#EXTINF:4,
http://assets.huluim.com/prerolls/np/abc-preroll-480k_1000/segment0.ts
#EXT-X-DISCONTINUITY
#EXTINF:10,
https://hulus-a.akamaihd.net/hulu12/11/50000011/agave50000011_586724_samourai.tar/segment0.ts?authToken=1275...a744c
#EXTINF:10,
https://hulus-a.akamaihd.net/hulu12/11/50000011/agave50000011_586724_samourai.tar/segment1.ts?authToken=1275...7ea20
#EXTINF:11,
https://hulus-a.akamaihd.net/hulu12/11/50000011/agave50000011_586724_samourai.tar/segment2.ts?authToken=1279...2e
```

FIG. 6

METHOD AND APPARATUS FOR INTUITIVE NAVIGATION OF A MEDIA PROGRAM

CROSS REFERENCE TO RELATED APPLICATIONS

This application claims benefit of U.S. Provisional Patent Application No. 61/359,309, entitled "METHOD AND APPARATUS FOR INTUITIVE NAVIGATION OF A MEDIA PROGRAM," by Robert M. Wong, Charles B. Reeves, and Eugene Chuan-Huai Wei, filed Jun. 28, 2010, which application is hereby incorporated by reference herein.

This application is also related to the following patent application(s), all of which applications are incorporated by reference herein:

U.S. Provisional Patent Application Ser. No. 61/359,319 entitled "METHOD AND APPARATUS FOR PROVIDING STREAMING MEDIA PROGRAMS AND TARGETED ADVERTISEMENTS COMPATIBLY WITH HTTP LIVE STREAMING," Jun. 28, 2010, by William Z. Holt, Xinan (NMI) Wu, Eden (NMI) Li, Alexander V. Guiarian and Baptiste Coudurier; and U.S. Provisional Patent Application Ser. No. 61/359,258, entitled "METHOD AND APPARATUS FOR SYNCHRONIZING PAUSED PLAYBACK ACROSS PLATFORMS," Jun. 28, 2010, by Robert M. Wong and Eden (NMI) Li, which claims priority to U.S. Provisional Patent Application Ser. No. 61/359,258, by Robert M. Wong and Eden (NMI) Li, filed Jun. 28, 2010.

BACKGROUND OF THE INVENTION

1. Field of the Invention

The present invention relates generally to systems and methods for navigating a media program, and more specifically to a method and apparatus for navigating a media program having an integrated jog control.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Transmission protocols have been developed to transmit media programs to such devices, including live media programs. One such transmission protocol is the HTTP live streaming protocol of the IETF (Internet Engineering Task Force) Trust available at http://tools.ietf.org/html/draft-pantos-http-live-streaming-04 and in the attached appendix.

The transmission and presentation of media programs to mobile devices offers additional challenges. First, the bandwidth of the communication channel is typically less than that of non-mobile devices. This can limit the responsiveness of the device to user commands, thus making it more critical to navigate the desired portion of the media program the first time. Second, the processing power of such devices is typically less than that of an ordinary computer or special purpose device, also making it important to navigate to the desired portion of the media program the first time. Third, the devices themselves are also smaller, providing less real estate for presenting controls for user-navigation of the media program. And fourth, such devices are also power limited, making it advantageous to provide controls that allow the user to select the desired portion of the media program as directly as possible and with the least user input.

What is needed is a method and apparatus for providing such controls. The present application satisfies that need.

SUMMARY OF THE INVENTION

To address the requirements described above, a method, apparatus, article of manufacture, and a memory structure for navigating a media program is disclosed. In one embodiment, the invention is evidenced by a method of navigating a media program having a plurality of frames, comprising the steps of providing a jog control, the jog control comprising a radial control at one of a plurality of user-selectable radial distances from a center of the jog control, the user selected radial distance indicative of a jog control scale factor, accepting a selection of the radial control at a selected one of the user-selectable radial distances from the center of the jog control, and accepting a rotation of the radial control about a center of the radial control, thereby commanding navigation through the plurality of media program frames at a rate determined by the selected jog control scale factor and an angular rate of the selected radial control about the center of the jog control. In another embodiment, the invention is embodied in an interface that includes a jog control, comprising a radial control at one of a plurality of user-selectable radial distances from a center of the jog control, the radial distance indicative of a jog control scale factor, wherein selection of the radial control selects and fixes the jog control scale factor until the control area is unselected, and wherein rotation of the selected radial control about a center of the jog control commands navigation through the plurality of media program frames at a rate determined by the selected jog control scale factor and an angular rate of the selected radial control about the center of the jog control.

BRIEF DESCRIPTION OF THE DRAWINGS

Referring now to the drawings in which like reference numbers represent corresponding parts throughout:

FIG. 6 is a diagram of an exemplary segment playlist.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
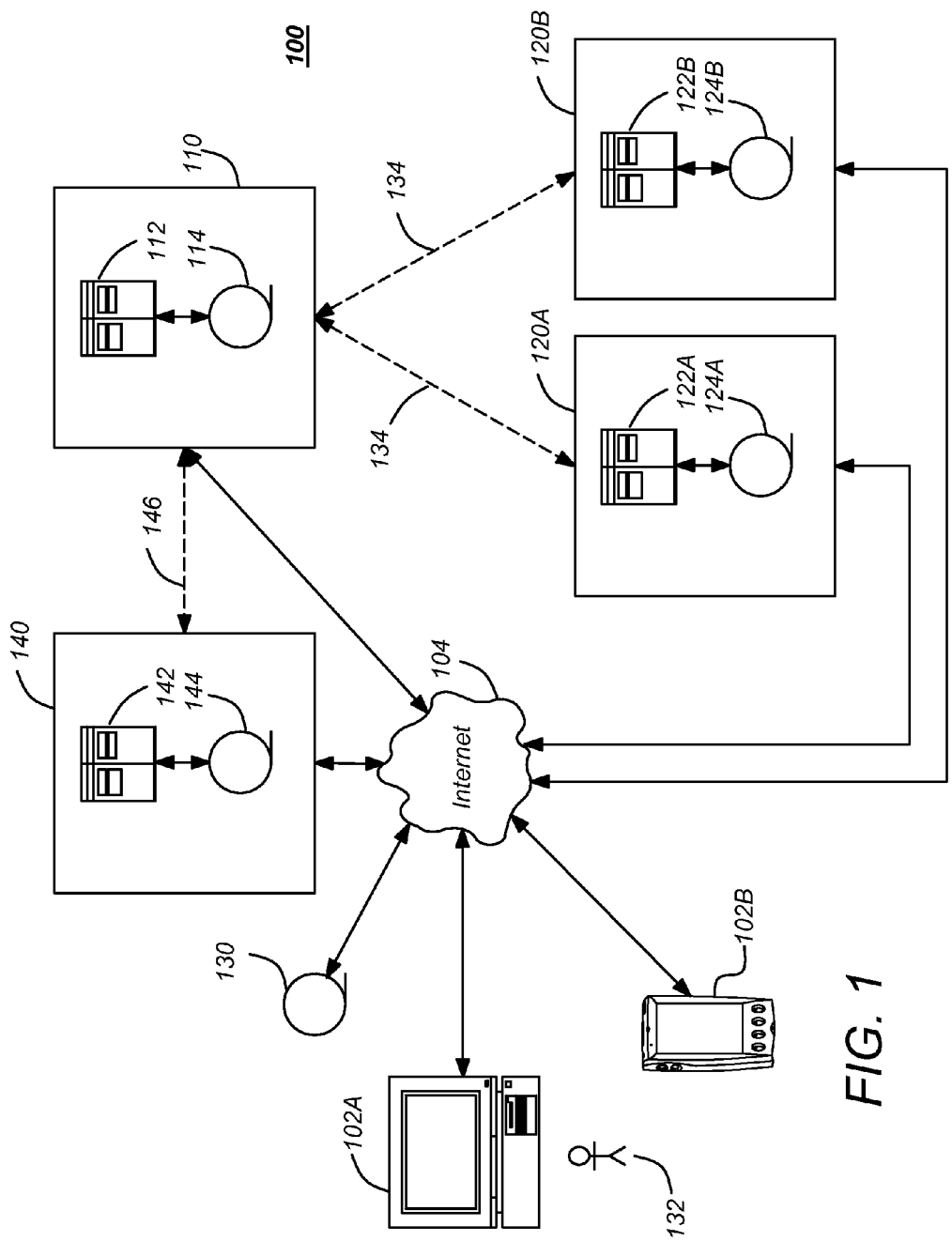
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 120). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
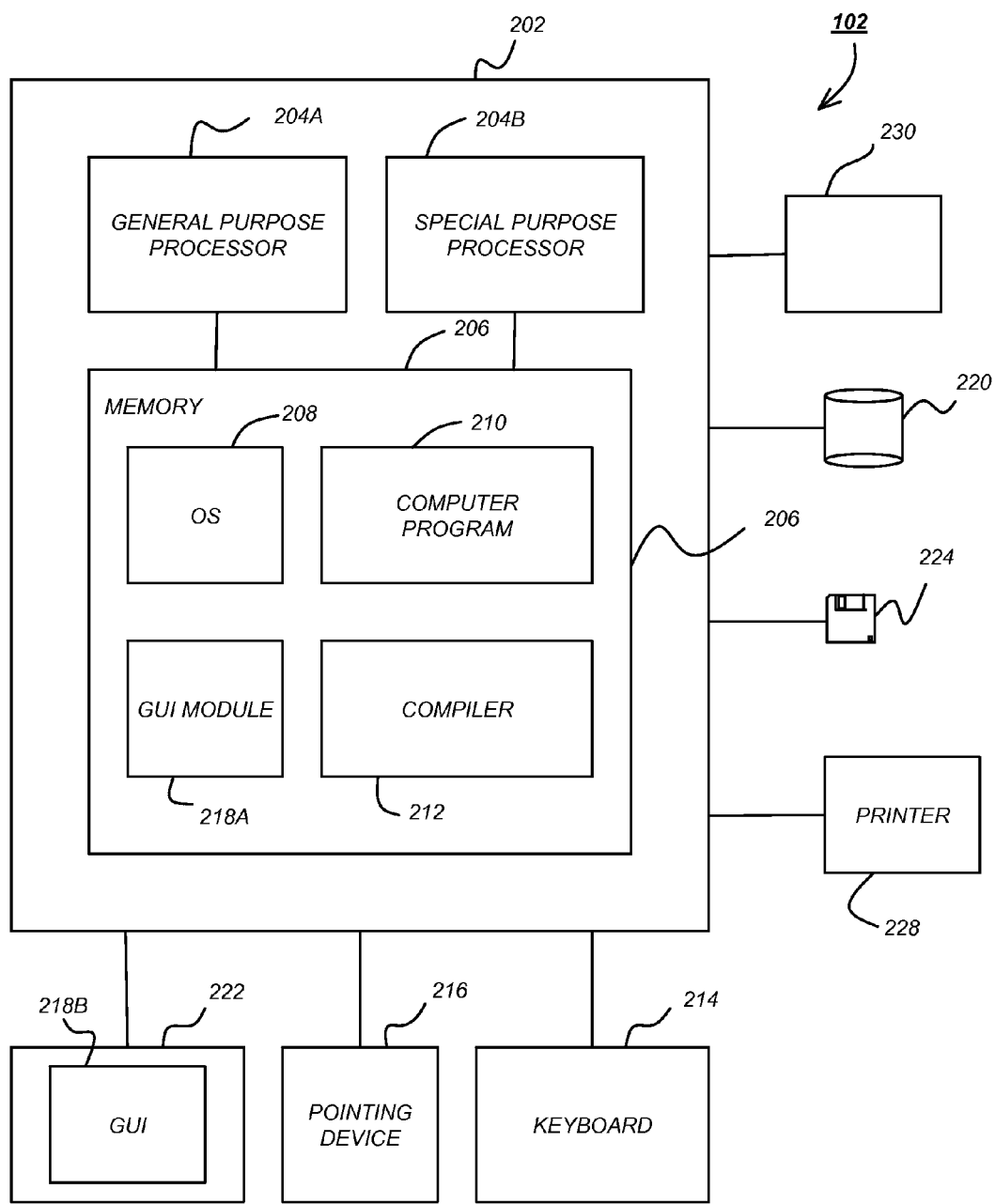
FIG. 2 illustrates an exemplary processing system that could be used to implement the present invention.

FIG. 2 illustrates an exemplary processing system 202 that could be used to implement elements of the present invention, including the user devices 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands.

Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, personal data assistants (PDAs) or any other device with suitable processing, communication, and input/output capability.

Figure 3:
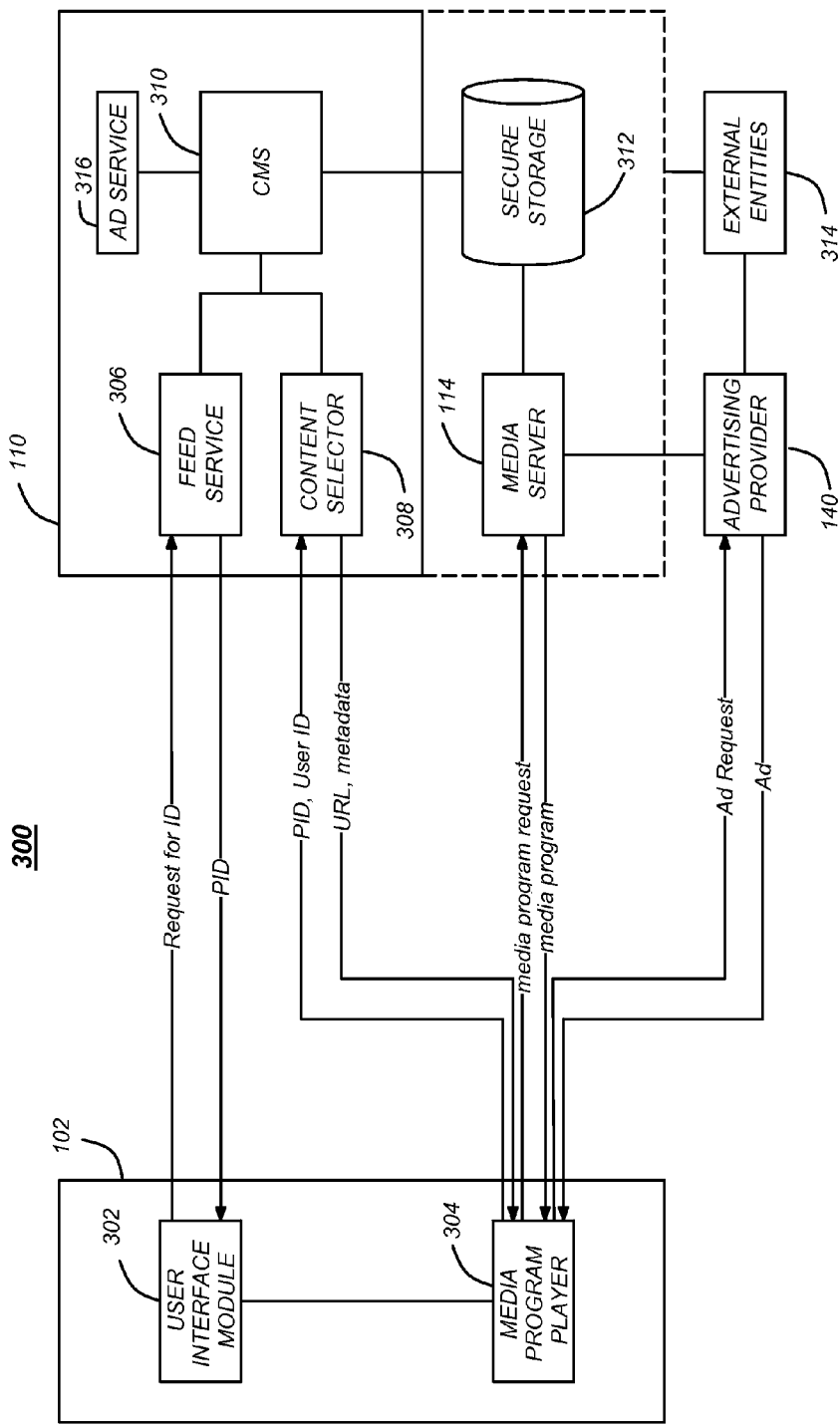
FIG. 3 is a diagram illustrating a content delivery subsystem and top-level operations that can be used to deliver media programs and advertisements for presentation to a user.

FIG. 3 is a diagram illustrating a first embodiment of a content delivery subsystem (CDS) 300 and top-level operations that can be used to deliver media programs and advertisements for presentation to the user 132. In the illustrated embodiment, the content delivery subsystem 300 includes the user device 102, a media program provider 110, and an advertisement provider 140.

In the illustrated embodiment, the media program provider 110 comprises a feed service 306, a content selector 308 and a content management service 310. When the user 132 selects a media program using the user device 102, a message is transmitted from the user device 102 to the media program provider 110 requesting the media program identifier (PID) of the selected media program. The feed service 306 recites the request, and using information obtained from secure storage 312 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. The content management service 310 forwards this information to the content selector 318, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 114 at a specified address. The media server 114 retrieves the media program from secure storage, and transmits the media program to the user device 102. The user device 102 may also request advertisements from the advertising provider 120 and receive them as well.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information is stored in the content delivery system 300 in database 312, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

Figure 4:
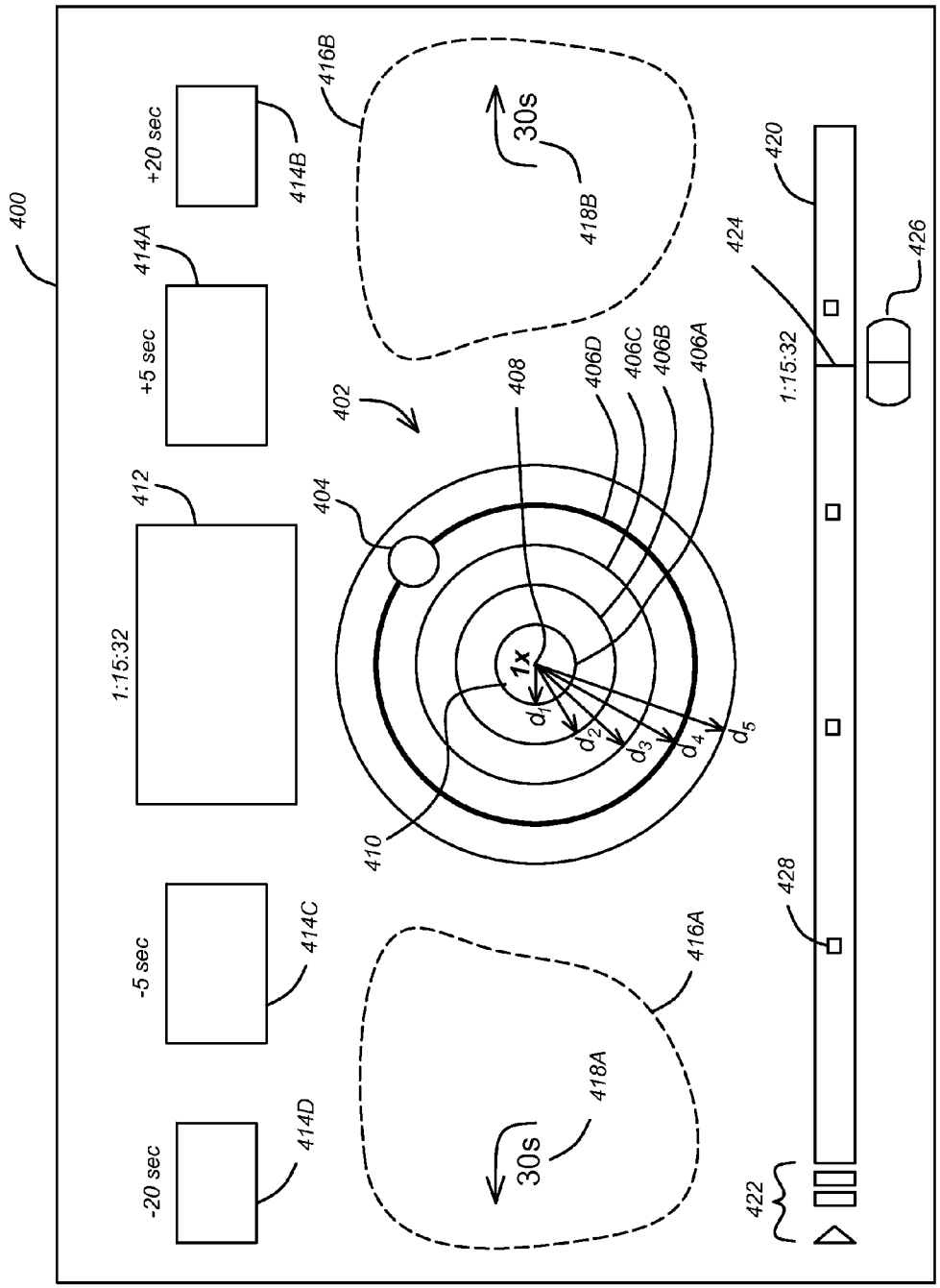
FIG. 4 is a diagram showing an exemplary view of a user interface presenting controls for use in navigating a media program.

FIG. 4 is a diagram showing an exemplary view of a user interface presenting controls for use in navigating a media program. The user interface 400 includes a jog control 402. The jog control 402 comprises a radial control 404 at one of a plurality of user selectable distances $d_1$-$d_5$ 406A-406E from a center 408 of the jog control 402. The radial distance of radial control 404 from the center 408 of the jog control indicates the jog control scale factor (which determines of how many media program frames or seconds of the media program are navigated through for each turn of the jog control 402), as described more fully below. In the illustrated embodiment, the jog control scale factor is displayed for user reference in region 410.

Selection of the radial control 404 at a distance from the center 408 of the jog control selects and fixes the jog control scale factor until the control area is unselected. For example, if the user manipulates a cursor or touches the screen showing the interface 400 at radial distance $d_4$ on line 406D, the scale factor is set for 1× and will remain so until the radial control 404 is unselected. Such "unselection" can be accomplished by touching the radial control 404 again in the same position as illustrated, or manipulating the cursor or touching the screen at another distance ($d_2$, for example) from the center of the jog control.

Prior art jog controllers are operated by essentially rotating the jog control 402 in a clockwise direction if fast forward motion was desired, or in a counter clockwise direction if reverse or fast reverse motion was desired. The sensitivity of the motion (that is, whether the frames moved at the normal playback rate, double the playback rate, four times the playback rate, etc) was determined by how much of an angle clockwise or counterclockwise the jog control was rotated. For example, a 30 degree rotation of the jog control might double the playback speed, while a 45 degree rotation of the jog control might increase the playback speed by a factor of four. The problem with such jog controls is that while they look similar to the jog control shown in FIG. 4, they are not well suited to mobile application or applications with little control surface real estate. Unlike the stationary devices that use prior art jog controllers, mobile devices are typically held in one hand and manipulated with the other. They are also often used under circumstances where they are jostled around, making it difficult to use a prior art jog controller.

In contrast to prior art jog controllers, the jog controller 402 shown in FIG. 4 operates by rotating the radial control 404 in peripherally about the center 410. As such, instead of the angle of rotation determining the jog scale factor, the angle of rotation determines the specific frame that is shown in primary thumbnail 412, with an angular deflection of the radial control 404 shifting the frame presented in the primary thumbnail 412 by a number of frames determined by the jog scale factor. For example, if the jog scale factor is 1× (as illustrated), moving the radial control 404 an angle of 15 degrees clockwise may, for example, navigate the media program to the next frame in a forward direction, with a small image for that frame presented in primary thumbnail 412. Another 15 degree rotation in the same direction (for a total of 30 degrees) may move to the next frame from the currently displayed frame, and so on. If a jog scale factor of 2× were selected (as described below), a 15 degree rotation in the clockwise direction would move the media program a distance twice that of the 1× scale factor, or two frames forward, while a 30 degree rotation (another 15 degrees) may navigate to a frame of the media program that is 4 frames from the original location. Accordingly, rotation of the selected radial control 404 about the center 410 of the jog control 404 commands navigation though the plurality of media program frames at a rate determined by the selected jog control scale factor and an angular rate of the selected radial control about the center of the jog control.

In one embodiment, each of the plurality of the user selectable radial distances $d_1$-$d_5$ are delineated by one of a plurality of associated circumferential lines 406A-406E (hereinafter alternatively referred to as circumferential line(s) 406). The user 132 selects the desired circumferential line 406 by mousing over the line and selecting the desired circumferential line 406, or by touching the display along the circumferential line 406. The selected circumferential line 406 may be indicated by illuminating or otherwise delineating the circumferential line 406, as shown with respect to line 406D. The scale factor implemented by selection of the line 406 can be indicated in an area in the center of the jog control 402 or elsewhere.

After selecting the desired scale factor, the user 132 moves the radial control 404 in a clockwise direction to move forward in the media program, and in a counterclockwise direction to move in reverse. As the user 132 does so, a thumbnail of the currently selected or navigated to frame of the media program is presented in thumbnail area 412.

In one embodiment, once the user has selected a scale factor by designating a radius from the center of the jog control, that scale factor remains selected until it is unselected. This embodiment accounts for the fact that it is difficult for the user 132 to sweep the radial control 404 around the center of the jog control 402 in a circle. If a different scale factor is desired, the user 132 need only select the newly desired scale factor (e.g. by selecting the appropriate circumferential line or ring), and the user can also unselect the selected scale factor by unselecting the circumferential line. This can be accomplished, for example, by touching the radial control 404*a* second time or by other user input.

In another embodiment, the scale factor is allowed to change as the user radial control 404 is moved about the center of the jog control 402. While this may result in substantially different scale factors as the user moves the radial control 404, the user 132 is still provided with adequate control. Further, in either of the above embodiments, the scale factor need not be limited to the simple multiples described above. Instead, the scale factor can be continuously selectable as the radial distance from the center of the jog control. This allows the user to select any scale factor they wish (e.g. 10×, 23× or 0.25×).

Although FIG. 4 illustrates an embodiment wherein the scale factor increases with the radial distance from the center 408, in other embodiments, the scale factor may decrease with the radial distance from the center 408.

In a still further embodiment of the invention, the number of frames that are advanced from the current frame by motion of the jog control 402 is determined from apparent the angular velocity of the angular acceleration of the jog control 402 when manipulated by the user. In such an embodiment, the user can rotate the jog control 402 quickly, using rapid spinning motions about the center 408, or may simply select a portion of the jog control 400 some distance from the center 408 and make a quick gesture to advance the frame to a temporally distant frame, with clockwise gestures commanding temporally later frames and counterclockwise gestures commanding temporally earlier frames than the current frame. Thus, it may take a full rotation to move forward one frame if the rotation is made slowly, but the smaller rotation, if made at a faster angular velocity, will advance a greater number of frames.

Mechanical dynamics may be used to simulate the motion of a physical jog control. For example, in an embodiment wherein the number of frames advanced or retrogressed is proportional to the angular position of the jog control 400, the angular position of the jog control 400 after a gesture may be described as follows:

$$\theta(t) = \theta_0 + \omega_0 t + \frac{\alpha_0 t^2}{2}$$

wherein $\theta(t)$ is the angular position of the jog control 400, $\omega_0$ is the initial velocity (typically zero) and $\alpha_0$ is the angular acceleration provided by the gesture. Typically, the angular acceleration is provided for a time $\Delta t$, and hence, the above equation devolves to:

$$\theta(t) = \theta_0 + \omega_0 t + \frac{\alpha_0 \Delta t^2}{2}$$

The dynamic friction of the jog control 400 may be simulated as being proportional to the velocity $\omega(t)$. Static friction may also be simulated, if desired.

Also, a mechanical dynamic model can be used wherein the number of frames advanced or retrogressed is proportional to the angular position of the jog control 400, and the angular position of the jog control 400 is defined as follows:

$$\theta(t) = \theta_0 + \omega_0 t$$

wherein $\theta(t)$ is the angular position of the jog control 400, $\omega_0$ is the initial velocity provided by the gesture. As before, friction may also be modeled.

It is also possible to determine the number of frames advanced or retrogressed simply as a function of the angular velocity of the gesture itself, without simulating dynamics.

FIG. 4 also illustrates additional thumbnail features 414A-414D. These features present thumbnails of media program frames that are disposed temporally forward and temporally behind the frame currently navigated to by a temporal distance measured in time or in frames. For example, in one embodiment, thumbnail feature 414A presents a thumbnail of the media program frame 5 seconds after the current frame, while 414C presents a thumbnail of the media program frame 5 seconds after the current frame. Similarly, frames 414B and 414D, may show thumbnails of media program frames 20 seconds after and before the currently navigated to frame 412, respectively. These images presented in the thumbnail features 412 and 414A-414D move in synchrony according to the user inputs to the jog control 402, the progress bar 416, and skip controls 418A and 418B described below. As illustrated, thumbnail feature 414A is disposed adjacent and to the right of thumbnail 414, and thumbnail feature 414C is disposed adjacent to and to the left of thumbnail 414. Similarly, thumbnail feature 414B is disposed adjacent to and to the right of thumbnail 414A and thumbnail feature 414D is disposed adjacent to and to the left of thumbnail feature 414C.

In one embodiment, the interface 400 also includes gesture areas 416A, 416B (hereinafter alternatively referred to as gesture area(s) 416). The gesture areas 416 accept a sweep gesture to navigate the media program. Sweep gestures include, for example, the user touching a touch sensitive screen, retaining pressure on the screen while sweeping the finger to the right to advance the selected frame of the media program or mousing over a portion of the gesture area, selecting it, and performing an analogous motion. In one embodiment, the velocity of the sweep motion determines the number of frames that pass with each sweep, and the speed at which they pass by. In another embodiment, sweep inputs into the gesture areas 416 navigates the media program by the same number of frames or seconds. In the embodiment shown in FIG. 4, for example, a sweeping motion in the direction of arrow 418B in area 416B navigate forward through the media program 30 seconds, while a sweeping motion in the direction of arrow 418A in area 416A navigate backwards through the media program 30 seconds. Although illustrated to exclude other portions of the interface 400, the gesture areas may overlap other features of the interface 400. For example, the gesture area 416 may also encompass the thumbnail representations 412, 414. This is intuitively satisfying, as it allows the user to provide motion in an area near the thumbnail representations of the media program frames. Furthermore, the sweep areas 416 themselves may overlap. In other words, gesture areas 416A and 416B may overlap one another within the area of the thumbnails 412, 414 so that the user may start the sweeping motion on the left side of the interface, and sweep to the right side of the interface, or vice versa, to indicate the desired motion.

In the illustrated embodiment, the interface 400 also comprises a progress bar 420 and one or more controls 420 adjacent the progress bar 420 for navigating media program. In the illustrated embodiment, the controls 420 comprise a play and pause control, but other controls (fast forward, reverse, fast reverse and skip) may also be included. The progress bar 420 includes an indicator 424 indicating the currently navigated to position in the media program. As shown in FIG. 4, the time of the currently navigated frame or position may also be shown adjacent to the indicator. The progress bar 420 may also include a handle 426 which moves the indicator 424 about the progress bar 420, causing the interface 400 to navigate to the time or frame of the media program associated with the relative position of the indicator 424 within the progress bar. The progress bar 420 may also include one or more advertisement indicators 428, indicating where advertisements are distributed within the media program.

In one embodiment, the user 132 may simply undo any navigation and return to the previously navigated point by simply selecting a defined area of the interface 400. For example, a simple tap within the gesture areas 416 can be used to provide this input, or a special control may be used instead. Selection of the undo function returns the media program to the location it was in before the most recent navigation. Further, the navigated location of the media program can be saved for several navigation inputs, allowing the user 132 to not only return to the position of the media program navigated to before the most recently entered navigation command, but the position of the media program that was navigated to before that. This allows the user to go and back freely navigate to a position in the media program, and if it is desired to return to the previous position, this can be easily accomplished.

The media program can also be navigated via the thumbnail representations. For example, the user may simply select (via touch or mouseover) one of the thumbnail representations 414 to move to the frame that was touched.

It is noted that in many instances, the foregoing describes navigation of the media program in terms of frames, but navigation may also be accomplished and measured in terms of time, scenes, or any appropriate measure.

In one embodiment, using any of the foregoing controls, and the interface 400 modifies the presentation of the other controls to be consistent with the navigation input just received and the current location within the media program. For example, if the user 132 manipulates the jog control 402 to navigate the media program to the frame 1:15:32 into the media program, the progress bar 420 and thumbnails 412, 416 are all updated accordingly. Hence, the indicator 424 is moved to a place on the progress bar 420 consistent with the currently navigated to frame or time in the media program, and feature 412 shows a thumbnail of the frame of the media program at 1:15:32. The other thumbnail features 416 show the frames ±5 and ±20 seconds from the 1:15:32 point in the media program. Similarly, any navigation using the progress bar 420 or the gesture areas 416 is also updated to the thumbnail representations 412, 416.

The navigation operations described above can be used to navigate a media program that has been downloaded (progressively or batched) and stored, a media program that is streamed to the user using conventional streaming protocols, or streamed using live streaming protocols.

To navigate downloaded and stored media programs, the input provided to the interface 400 merely command the media program player 304 to retrieve and present different frames from storage. To navigate media programs that are streamed using conventional streaming protocols, the media program player 304 may simply retrieves the selected frames from storage if the frames of interest have been buffered and transmits a request to the media server 114 for any frames that have not been buffered. Alternatively or in addition to the foregoing, the frames of the media program that are presented in the thumbnail renderings 412, 414 can be obtained as described in co-pending U.S. patent application Ser. No. 12/472,953, entitled "METHOD AND APPARATUS FOR SIMULTANEOUSLY PLAYING A MEDIA PROGRAM AND AN ARBITRARILY CHOSEN SEEK PREVIEW FRAME," by Andrew Cheng-min Lin, Daniel Honig Bear, Robert Masao Wong, and Charles Barclay Reeves, filed May 27, 2009, which application is hereby incorporated by reference herein.

Figure 5:
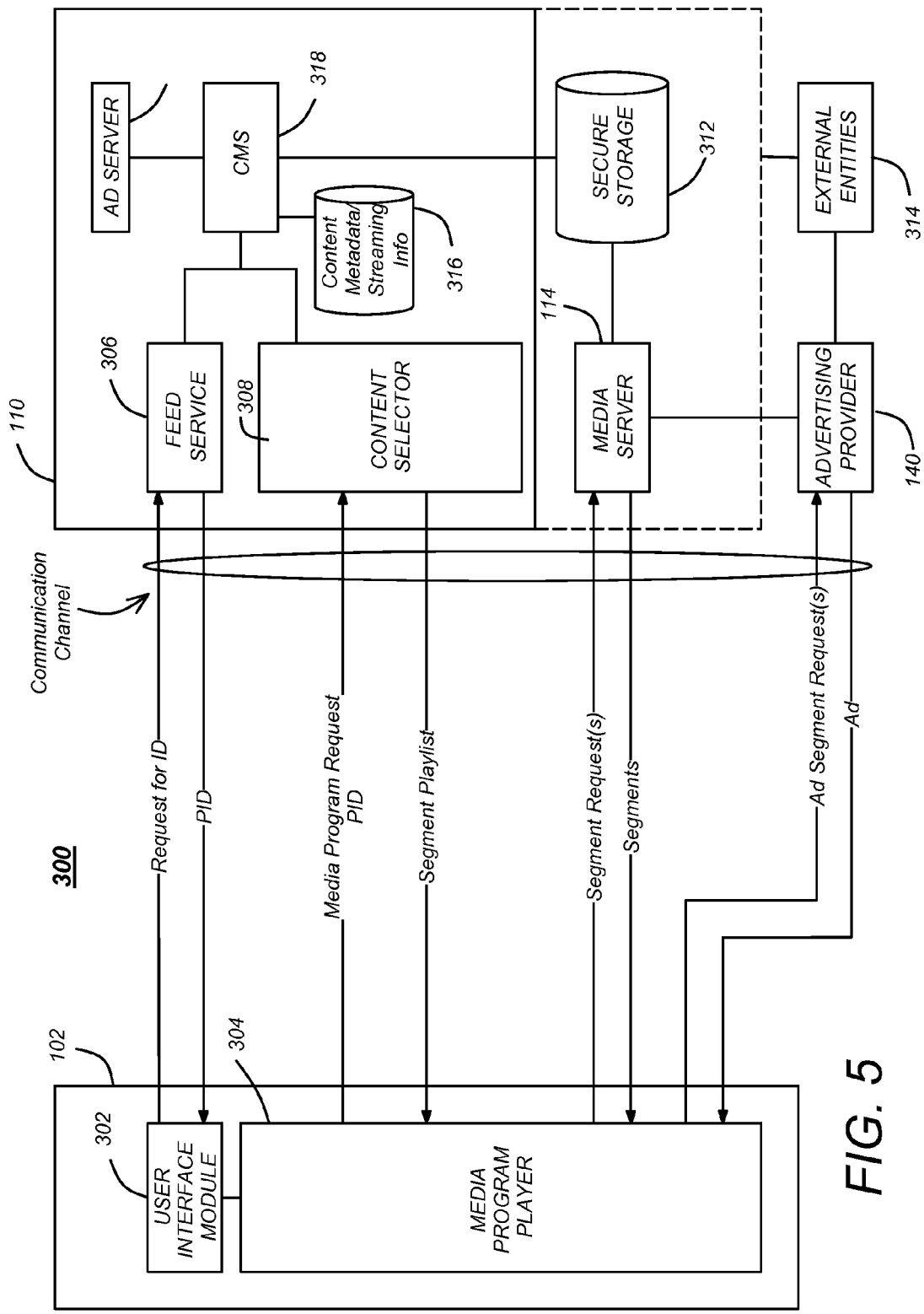
FIG. 5 is a diagram illustrating the transmission of media programs according to a live streaming protocol.

FIG. 5 is a diagram illustrating the transmission of media programs according to a live streaming protocol. Fundamentally, this protocol is similar to the protocol illustrated in FIG. 3, except that the when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 5, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

In this embodiment, the media program is broken up into a plurality of segments or chunks that can be transmitted to the user device 102 upon request from the user device 102. Which segments to request and the order to request them is determined by a segment playlist that is transmitted from the media program provider 110 to the user device 102.

FIG. 6 is a diagram of an exemplary segment playlist 600. Items 602A-602D are calls to a particular URI to retrieve a particular video segment. "#EXTINF" is a tag that is a record marker that describes the media file identified by the URI that follows it. Each media file URI MUST be preceded by an EXTINF tag. The format of the #EXTINF tag is #EXTINF:<duration>,<title>. Call 604A is a four second "splash" that is shown before the media program begins. Calls 602B and 602C are for segments of media program having a PID of 50000011 ten seconds long, while call 602C is to a segment of the same media program that is eleven seconds long. The calls 602A-602D also may include a token for purposes authorization purposes. The EXT-X-DISCONTINUITY 604 tag indicates an encoding discontinuity between the media file that follows it and the one that preceded it. The set of characteristics that MAY change include (1) file format, (2) number and type of tracks, (3) encoding parameters, (4) encoding sequence and/or (5) timestamp sequence.

Accordingly, the live streaming protocol includes the transmission of a segment playlist having addresses or URIs to the media program segments to the media program player 304. Since the media program player 304 has the information necessary to retrieve any segment (and hence, any frame) using the addresses or URIs in the segment playlist, the user interface module 302 implementing the interface 400, responds to the media program navigation commands by determining segment having the media program frames complying with the navigation request, requesting such segments (if they have not already been received and buffered), and presenting the frames from such segments as indicated above.

Since segments are typically approximately 10 seconds long, this means that media program navigation commands may require the media program player 304 to make frequent requests for new media program segments from the media server 314. To ameliorate this problem, the media program player 304 may perform predictive requests for media program segments. For example, if a user 132 has navigated from a point 0:02:00 (two minutes) from the beginning of the media program using one of the techniques described above, there is a reasonable probability that the user will also want to view other portions of the media program, including, those segments occurring between the beginning of the media program to a the two minute point. Under such circumstances, if bandwidth and processing capacity allows, the media program player 304 may request all of the segments in this interval, even if not selected by user 132 command, so that such segments are available for navigation at a later time.

In another embodiment, thumbnail representations of the media program frames are stored by either the media program player or the media server 114, and these thumbnail representations of the frames are retrieved and used by the media program player 304 to assist in navigation, for example, by displaying the thumbnail representations in the interface 400 in locations 412, 414.

Thumbnail representations of frames of the media program can be generated and stored in locally to the media program player for later retrieval. This can be accomplished, for example, by generating a thumbnail segment list having a URI to a lightweight version (e.g. fewer byte version with sufficient resolution for a thumbnail) of the media program segments to the media program player 304 and downloading and storing all those segments for later retrieval when navigating the media program.

Thumbnail representations of the frames of the media program can also be generated in advance, but stored remote from the media program player, for example, in the media program provider 110 or the media server 114. This can also be implemented by the generation of a thumbnail segment playlist that is analogous to the segment playlist, but has "lightweight" (lower byte) versions of the media program frames. In this embodiment, when the user 132 navigates to a different portion of the media program, the media program player 304 determines which of the media program segments of the segment playlist are implicated, and also determines which of the lightweight media program segments of the lightweight segment playlist are implicated in the navigation request. The media program player 304 thereafter transmits a request to the URIs for the media program segments and the lightweight media program segments, and presents the lightweight media program segments on the interface 400 for navigation purposes.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A user interface for navigating a media program having a plurality of frames, comprising:
   a jog control displayed on the user interface, comprising:
   a radial control at one of a plurality of user-selectable radial distances from a center of the jog control, the radial distance indicative of a jog control scale factor;
   wherein a user selection of the radial control on the user interface at a radial distance from the center selects and fixes the jog control scale factor until a control area of the jog control is unselected; and
   wherein rotation of the selected radial control from a first position to a second position about the center of the jog control by user input causes navigation through the plurality of media program frames at a rate determined by the selected jog control scale factor that is fixed and an angular rate of the selected radial control from the first position to the second position about the center of the jog control even when different user-selectable radial distances are selected while rotation of the selected radial control is performed from the first position to the second position.

2. The user interface of claim 1, wherein the radial control is selected by touching the radial control and unselected by untouching the radial control.

3. The user interface of claim 1, wherein the radial control is selected by touching the radial control and unselected by retouching the radial control.

4. The user interface of claim 1, wherein each of the plurality of user-selectable radial distances are delineated by one of a plurality of circumferential lines, and the selected radial distance is delineated from unselected radial distances.

5. The user interface of claim 1, further comprising a first thumbnail of a currently navigated to frame of the media program.

6. The user interface of claim 5, further comprising:
   a second thumbnail disposed adjacent to and to the right of the first thumbnail, the second thumbnail displaying a second media program frame a first temporal distance forward of the currently navigated to frame of the media program; and
   a third thumbnail disposed adjacent to and to the left of the first thumbnail, the third thumbnail displaying a third media program frame the first temporal distance behind the currently navigated to frame of the media program.

7. The user interface of claim 6, further comprising:
   a fourth thumbnail disposed adjacent to and to the right of the second thumbnail, the fourth thumbnail displaying a fourth media program frame a second temporal distance forward of the currently navigated to frame of the media program; and
   a fifth thumbnail disposed adjacent to and to the left of the third thumbnail, the fifth thumbnail displaying a fifth media program frame the second temporal distance behind the currently navigated to frame of the media program.

8. The user interface of claim 1, further comprising a gesture area for accepting a sweep gesture to navigate the media program.

9. The user interface of claim 1, further comprising a progress bar having a cursor control for navigating the media program.

10. The user interface of claim 1, further comprising a control for undoing a most recent navigation through the plurality of media program frames.

11. A method of navigating a media program having a plurality of frames, comprising:
providing a jog control that is displayed on a user interface, the jog control comprising:
a radial control at one of a plurality of user-selectable radial distances from a center of the jog control, the user selectable radial distance indicative of a jog control scale factor;
accepting a user selection of the radial control on the user interface at a selected one of the user-selectable radial distances from the center of the jog control, the selected one of the user-selectable radial distances associated with a selected jog control scale factor; and
accepting a rotation of the radial control from a first position to a second position about a center of the radial control by user input, thereby causing navigation through the plurality of media program frames at a rate determined by the selected jog control scale factor that is fixed and an angular rate of the selected radial control from the first position to the second position about the center of the jog control even when different user-selectable radial distances are selected while rotation of the selected radial control is performed from the first position to the second position.

12. The method of claim 11, wherein the radial control is selected by touching the radial control and unselected by untouching the radial control.

13. The method of claim 11, wherein the radial control is selected by touching the radial control and unselected by retouching the radial control.

14. The method of claim 11, wherein each of the plurality of user-selectable radial distances are delineated by one of a plurality of circumferential lines, and the selected one of the user-selectable radial distances is delineated from unselected radial distances.

15. The method of claim 11, further comprising:
providing a first thumbnail of a currently navigated to frame of the media program.

16. The method of claim 15, further comprising:
providing a second thumbnail disposed adjacent to and to the right of the first thumbnail, the second thumbnail displaying a second media program frame a first temporal distance forward of the currently navigated to frame of the media program; and
providing a third thumbnail disposed adjacent to and to the left of the first thumbnail, the third thumbnail displaying a third media program frame the first temporal distance behind the currently navigated to frame of the media program.

17. The method of claim 16, further comprising:
providing a fourth thumbnail disposed adjacent to and to the right of the second thumbnail, the fourth thumbnail displaying a fourth media program frame a second temporal distance forward of the currently navigated to frame of the media program; and
providing a fifth thumbnail disposed adjacent to and to the left of the third thumbnail, the fifth thumbnail displaying a fifth media program frame the second temporal distance behind the currently navigated to frame of the media program.

18. The method of claim 11, further comprising:
providing a gesture area, for accepting a sweep gesture to navigate the media program.

19. The method of claim 11, further comprising:
providing a progress bar having a cursor control for navigating the media program.

20. The method of claim 11, further comprising:
providing a control for undoing a most recent navigation through the plurality of media program frames.

21. An apparatus for navigating a media program having a plurality of frames, comprising:
means for providing a jog control that is displayed on a user interface, the jog control comprising:
a radial control at one of a plurality of user-selectable radial distances from a center of the jog control, the user selectable radial distance indicative of a jog control scale factor;
means for accepting a user selection of the radial control on the user interface at a selected one of the user-selectable radial distances from the center of the jog control, the selected one of the user-selectable radial distances associated with a selected jog control scale factor; and
means for accepting a rotation of the radial control from a first position to a second position about a center of the radial control by user input, thereby causing navigation through the plurality of media program frames at a rate determined by the selected jog control scale factor that is fixed and an angular rate of the selected radial control from the first position to the second position about the center of the jog control even when different user-selectable radial distances are selected while rotation of the selected radial control is performed from the first position to the second position.

22. The apparatus of claim 21, wherein the radial control is selected by touching the radial control and unselected by untouching the radial control.

23. The apparatus of claim 21, wherein the radial control is selected by touching the radial control and unselected by retouching the radial control.

24. The apparatus of claim 21, wherein each of the plurality of user-selectable radial distances are delineated by one of a plurality of circumferential lines, and the selected one of the user-selectable radial distances is delineated from unselected radial distances.

25. The apparatus of claim 21, further comprising:
means for providing a first thumbnail of a currently navigated to frame of the media program.

26. The apparatus of claim 25, further comprising:
means for providing a second thumbnail disposed adjacent to and to the right of the first thumbnail, the second thumbnail displaying a second media program frame a first temporal distance forward of the currently navigated to frame of the media program; and
means for providing a third thumbnail disposed adjacent to and to the left of the first thumbnail, the third thumbnail displaying a third media program frame the first temporal distance behind the currently navigated to frame of the media program.

27. The apparatus of claim 26, further comprising:
means for providing a fourth thumbnail disposed adjacent to and to the right of the second thumbnail, the fourth thumbnail displaying a fourth media program frame a second temporal distance forward of the currently navigated to frame of the media program; and
means for providing a fifth thumbnail disposed adjacent to and to the left of the third thumbnail, the fifth thumbnail displaying a fifth media program frame the second temporal distance behind the currently navigated to frame of the media program.

28. The apparatus of claim 21, further comprising:
means for providing a gesture area, for accepting a sweep gesture to navigate the media program.

29. The apparatus of claim 21, further comprising:
means for providing a progress bar having a cursor control for navigating the media program.

30. The apparatus of claim 21, further comprising:
means for providing a control for undoing a most recent navigation through the plurality of media program frames.

* * * * *